United States Patent [19]
Golding

[11] Patent Number: 5,933,100
[45] Date of Patent: Aug. 3, 1999

[54] AUTOMOBILE NAVIGATION SYSTEM WITH DYNAMIC TRAFFIC DATA

[75] Inventor: Andrew R. Golding, Cambridge, Mass.

[73] Assignee: Mitsubishi Electric Information Technology Center America, Inc., Cambridge, Mass.

[21] Appl. No.: 08/579,003

[22] Filed: Dec. 27, 1995

[51] Int. Cl.[6] .................................................. G08G 1/123
[52] U.S. Cl. ......................... 340/995; 340/990; 340/988; 701/208; 701/213
[58] Field of Search ..................................... 340/995, 990, 340/989, 988, 994, 905; 364/449.1, 449.2, 449.5, 449.4; 701/207, 208, 211, 213

[56] References Cited

U.S. PATENT DOCUMENTS

| | | | |
|---|---|---|---|
| 5,089,826 | 2/1992 | Yano et al. | 340/995 X |
| 5,220,507 | 6/1993 | Kirson | 364/449.5 |
| 5,317,311 | 5/1994 | Martell et al. | 340/905 |
| 5,365,449 | 11/1994 | Kashiwazaki | 340/995 X |
| 5,371,678 | 12/1994 | Nomura | 340/995 |
| 5,402,117 | 3/1995 | Zijerhand | 340/905 |
| 5,450,343 | 9/1995 | Yurimoto et al. | 340/995 X |
| 5,452,217 | 9/1995 | Kishi et al. | 340/995 X |
| 5,473,324 | 12/1995 | Ueno | 340/990 |
| 5,523,950 | 6/1996 | Peterson | 340/905 |
| 5,539,398 | 7/1996 | Hall et al. | 340/907 |
| 5,539,645 | 7/1996 | Mandhyan et al. | 340/995 X |
| 5,543,789 | 8/1996 | Behr et al. | 340/995 |
| 5,610,821 | 3/1997 | Gazis et al. | 340/995 X |
| 5,648,768 | 7/1997 | Bouve | 340/988 |
| 5,689,252 | 11/1997 | Ayanoglu et al. | 340/905 |

*Primary Examiner*—Thomas Mullen
*Assistant Examiner*—Anh La
*Attorney, Agent, or Firm*—Dirk Brinkman

[57] ABSTRACT

A system located in an automobile provides personalized traffic information and route planning capabilities. This system uses equipment which is becoming standard in automobiles, such as on-board navigation systems and cellular telephones. On-board navigation systems use global positioning system (GPS) satellites to position the automobile with respect to streets in a map database. As the automobile moves, the navigation system updates the location. A central database includes travel time information for each street segment and transition between street segments in the map database. Based upon the travel time information in the database, a route from a current location to a desired destination, or series of destinations, can be planned in order to have a minimum travel time. The route can be provided to the on-board navigation system, which then directs the driver in traveling the route. The cellular telephone in the automobile can be used for communicating with the central database to obtain travel times for route planning. In order to provide dynamic travel time information to the central database, each automobile in the system operates as a data collector. As various street segments are traversed, the travel time for each segment is recorded. The travel time and street segment information is periodically transferred to the central database through the cellular telephone connection. The central database then combines the travel time data from each automobile to create accurate travel time data for each street segment.

32 Claims, 2 Drawing Sheets

| STREET SEGMENT IDENTIFIER | TRAVEL TIME | STANDARD DEVIATION | COLLECT TYPE | COLLECT VALUE | DATA POINTS | DATA NUMBER | DATA SUM | SQUARE SUM |
|---|---|---|---|---|---|---|---|---|
| | | | | | | | | |
| | | | | | | | | |
| | | | | | | | | |
| | | | | | | | | |

Fig. 2

AUTOMOBILE NAVIGATION SYSTEM WITH DYNAMIC TRAFFIC DATA

FIELD OF THE INVENTION

The present invention relates to a system for providing traffic report information, route planning assistance, and navigational assistance to automobiles. More particularly, it relates to a system having a central database in which travel time information is updated periodically from automobiles traveling in the system.

BACKGROUND OF THE INVENTION

Traffic reports on the radio or television provide useful information to travelers about accidents, heavy traffic, construction, and other conditions which can cause increases in expected travel times. This information is broadcast periodically, but may not be readily available when a person actually needs a report. Additionally, such reports only cover major highways and commuting routes. Often, drivers experience significant delays on routes which are not reported in any traffic reports. Therefore, it would be useful for drivers to be able to obtain accurate traffic reports covering the roads they intend to travel.

In addition to difficulties in providing useful reports, news agencies have difficulty in acquiring relevant traffic information for the roads which they do cover. Often, traffic report information is based upon personal observations provided to a news agency. News agencies have been using helicopters in order to monitor the major highways for significant backups and delays. They also use information provided to them from actual drivers as to delays, traffic conditions and travel times. Such sources cannot provide particularly useful information or objective data as to the likely extent of delays in traffic.

Various attempts have been made to create automated systems for determining traffic information, and to provide more objective estimates of traffic flow. For example, U.S. Pat. No. 5,465,289 discloses a method and apparatus for determining vehicular traffic information using existing cellular telephone technology. Sensors are used to monitor cellular telephone communication information. Data from the cellular communications are extracted and analyzed to determine vehicle locations and travel information. The system requires a statistical model for determining location of automobiles within each cell of the cellular system. As with news reports, this system only provides information relating to major thoroughfares, and cannot provide information relating to individual street segments.

In addition to traffic report information, systems have been and are being developed for providing route planning information and navigational assistance to drivers. One such system is illustrated in U.S. Pat. No. 5,272,638, assigned to Texas Instruments Incorporated. This system includes a digital road map database providing information about road segments, intersections, and travel times for road segments. Information in the database is used to plan routes having minimal travel time from one location to another. More efficient route planning is obtained by using a route hierarchy of local areas around the starting and ending locations, major thoroughfares between local areas, and major freeways for longer travel distances. Preferably, vehicle location information can be determined using satellite systems or some other positioning method. Instructions can then be provided audibly or visually to the driver when turns are necessary in the travel plan. This patent provides suggestions for a process for determining a route based upon the travel destination and the travel times stored in the database. However, the patent does not describe how the information in the database can be obtained. It suggests that dynamic traffic information can be obtained through a traffic interface. A traffic interface may receive digital broadcast over radio sidebands, or from centralized cellular phone systems containing information on traffic obstacles such as accidents and amounts of the resulting delays. However, no suggestion is made as to how such dynamic information is collected or organized for transfer to the system in the vehicle. Therefore, a need exists for a system which provides for collection, organization and dissemination of traffic information which can be used in a route planning and navigation system.

U.S. Pat. No. 5,459,667, assigned to Sumitomo Electric Industries, Ltd., is another example of a vehicle navigation system. The system disclosed in this patent provides for more accurate vehicle location determinations and a capability to determine whether the vehicle is traveling on an optimum route between starting and ending locations. As with the previously-described system, this system uses a database having information relating to street segments and travel times in order to estimate the optimum route. Preferably, the travel information is stored in a CD ROM. Since the information is stored in a CD ROM, it is not easily changeable and cannot be adjusted for changes in travel times resulting from changes in road conditions. Again, this system does not determine how to create the database, to determine travel time, or how to adjust travel time to account for traffic conditions.

The Illinois Department of Transportation is developing a system, called ADVANCE (Advanced Driver and Vehicle Advisory Navigation ConcEpt). The ADVANCE system is described in several articles including "Operation of the ADVANCE Traffic Information Center" by Jeffrey Hochmuth (Jan. 25, 1995) and "ADVANCE-Initial Deployment" by Joseph S. Ligas and Syde Bowott, ITS America, 1995 Annual Conference (March, 1995). A traffic information center collects and organizes traffic data from a variety of sources. These sources include a closed loop traffic signal system, a cellular based motorist call-in system, a motorist assistance system, and emergency dispatch systems. The information is used to create historical databases and a CD ROM of travel data. Each vehicle is provided with a mobile navigation assistant, which provides route planning using both static and dynamic travel time data. Static data are provided by the CD ROM. The mobile navigation system provides route planning and navigational information similar to the systems described above. In addition to static information, the mobile navigation assistance communicates with the traffic information center through a radio frequency communications network to obtain dynamic traffic information data. The dynamic traffic data can be used for more accurate route planning, or for rerouting based upon new information. The ADVANCE system also anticipates using vehicles as traffic probes to provide real time traffic information. The vehicles would transmit data to the traffic information center over the radio frequency communications network on recently traversed streets in the system. The traffic information center would combine this information with the traffic information from other sources in creating its dynamic traffic data. Although the ADVANCE system is still being developed and the descriptions are incomplete, several disadvantages are apparent in the system. Significant additional equipment is needed in the vehicle to operate the system. Much of this equipment is duplicative of functions performed by other equipment already present in many vehicles. The radio communications equipment would need specific frequencies and may interfere with other radio communications. Additionally, no method for combining dynamic data from automobiles with other information relating to potential traffic delays is indicated. The use of additional information may cause distortion of the dynamic traffic data unless the effect of the traffic conditions from the outside sources can be accurately reflected in the travel times used for route planning.

Furthermore, each of the navigation systems described above include only travel times for various street segments. Often, delays are caused by transitions between street segments.

SUMMARY OF THE INVENTION

The present invention provides a system for personalized traffic reports and route planning using dynamically updated travel information in conjunction with equipment currently found in automobiles. Many new automobiles include as standard equipment an on-board navigation system. Such a system uses static travel time data in connection with street data to provide navigational information to the operator of the automobile. Typically, GPS satellites are used to locate the automobile within the street system of the navigation system. A map of the surrounding streets can then be displayed to the operator. Sometimes, such systems also include route planning information. If not already included in the on-board navigation system, in one embodiment, the present invention would include a route planning system which uses the travel time information to determine a route having minimum travel time, or meeting other criteria.

In conjunction with the navigation system in the automobile, in one embodiment, a central database would collect and store travel time information for the various street segments. When updated, the travel time information can be transferred from a central database to the individual automobiles. Preferably, the information is transferred through a wireless communication device, such as a cellular telephone. Since automobiles often include a cellular telephone as standard or add-on equipment, and a cellular network is already in place in most cities, the present invention can make use of this existing equipment. The automobile would merely require a modem in order to receive data from the central database. In addition to including time for traversing street segments, the database would also include times for transitions between segments. The transition times between segments would include different times for people proceeding through an intersection to a following street segment or turning onto adjoining street segments. The use of transition times can assist in more accurately reflecting travel time and determining optimum routes. Alternatively, the street segments can be defined between midpoints of blocks, which can include turns.

In addition to providing navigation assistance, in a preferred embodiment, the navigation system can be used to determine travel time data for adjusting the travel times in the central database. Since the navigation system determines the location of the automobile with respect to street segments of a map database, the movement of the automobile on various street segments can be collected. A timer, which can include the existing clock in the automobile, can be used for determining times for traversing the street segments. The times for transitions between street segments can also be determined. Once the data are collected, it can be transferred to the central database through the same wireless communication device, i.e., the cellular telephone. The data can be collected and then transferred at periodic intervals.

In a preferred embodiment the central database can then be updated using information received from the automobile data collection. Preferably, the travel time in the database would include a moving average having a certain number of data points or a specific time period. As traffic becomes more congested, the travel times reported by the automobiles would increase, and the moving average would become greater. As traffic became less congested, the reported times would decrease and the moving average would similarly be reduced. The number of data points or time period used in producing the moving average could be varied by street segments depending upon the frequency of use of the street segment. In addition, the central database can determine a standard deviation for travel times on the street segments. The standard deviation information can be used to omit data points which appear erroneous. Data points caused by brief delays on a travel segment can also be omitted to prevent skewing of the data.

BRIEF DESCRIPTION OF THE DRAWING

These and other features of the Subject Invention will be better understood in connection with the Detailed Description taken in conjunction with the Drawings of which:

FIG. 2 represents storage of travel time information in a central database in conjunction with the system of FIG. 1.

DETAILED DESCRIPTION

Figure 1:
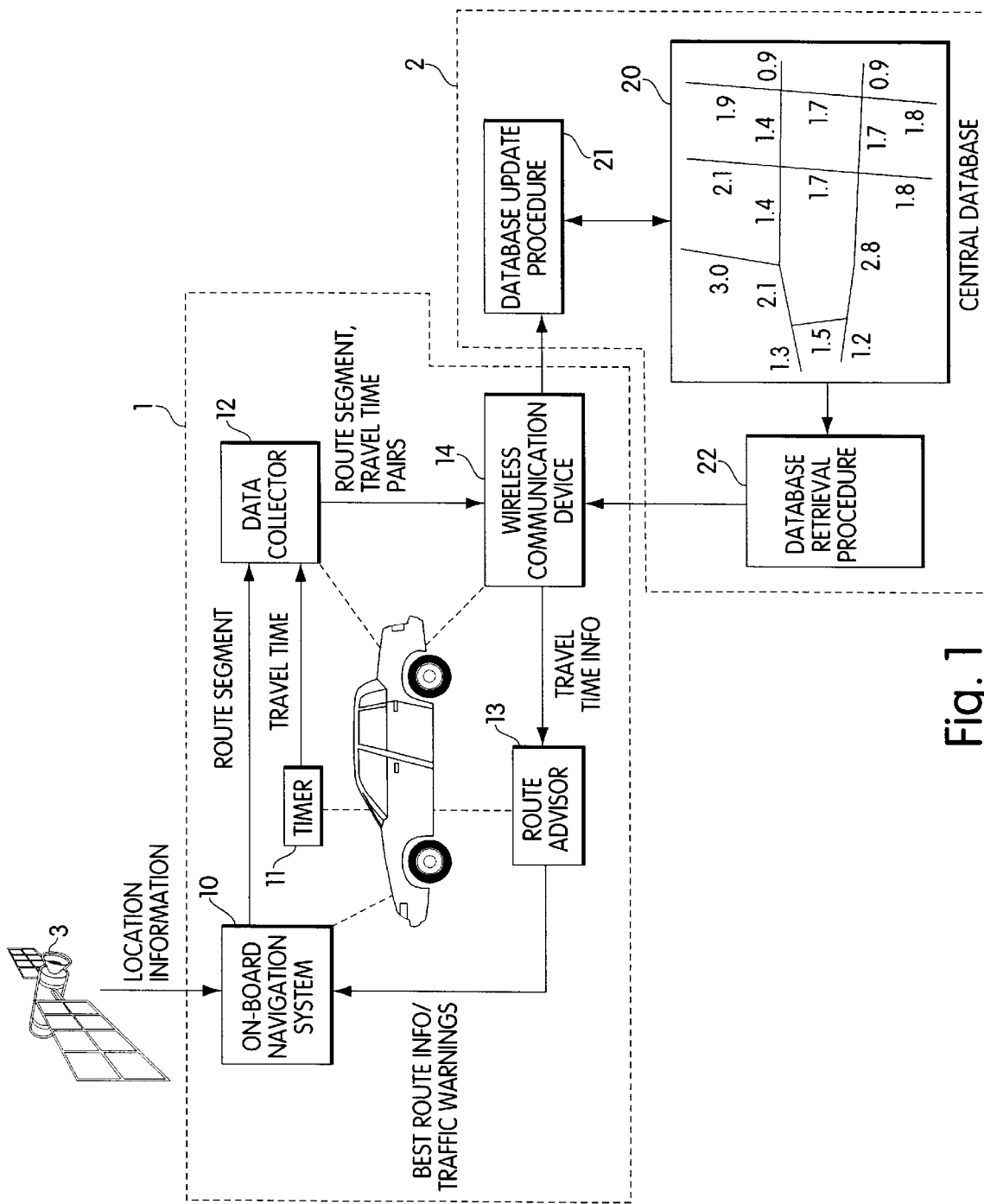
FIG. 1 illustrates an embodiment of the route planning and navigation system of the present invention.

As illustrated in FIG. 1, the route planning and navigation system of the present invention includes a vehicle navigation system 1 and a central database 2. The vehicle navigation system 1 is located on each automobile within the system. The vehicle navigation system 1 includes an on-board navigation system 10, which can include a standard system currently found on some automobiles. The on-board navigation system 10, includes a map database having data relating to street segments and intersections between street segments. The on-board navigation system 10 also includes sensors for receiving transmissions from GPS satellites 3. An appropriately designed processor locates the automobile, using the satellite information, on the street segments in the map database. The on-board navigation system 10 can provide information to the operator relating to the current position and a map of surrounding streets. The navigation system can also indicate when turns are to be made in accordance with a particular route.

The best route from a starting point to a destination location can be determined by the route advisor 13. The route advisor would include a database of travel time information corresponding to the street segments in the map database. Alternative, in order to limit the required memory, the route advisor can have travel time information for only a portion of the map database in which the automobile is presently located. The route advisor could then obtain any additional travel time information from the central database, as needed. The route advisor can process the information in the database according to one of several known processes to determine an optimal travel route from the starting to ending locations.

As the on-board navigation system 10 monitors the location of the automobile, it outputs route segments which have been traversed. A timer 11 is used to determine a travel time for each route segment. The clock in the automobile may be used as the timer 11. In addition to street segments, the system can include representations of transitions between street segments. Transitions can also be timed to represent times for crossing intersections or making turns. The route segments and travel times are stored in the data collector 12, to be used to update the travel time database.

The central database 2 is used for dynamically updating travel time data based upon information collected from all of the vehicles in the navigation system. A wireless communication device 14 is used to communicate between the automobiles and the central database. Preferably, the wireless communications device 14 would be a cellular telephone. Such devices are becoming standard in automobiles, and a cellular communication system is already in place in most cities. The wireless communication device 14 would include a modem connected to the data collector 12 and the route advisor 13 for transferring travel time information into and out of the automobile. The modem will periodically call up the central database 2 and transfer information from the data collector 12. In order to limit communication time, the data collector 12 will only provide the information at certain time intervals, such as every five minutes. Additionally, the data collector 12 can compare the actual travel time to the estimated travel time in the route advisor 13 database. If the measured travel time is within a certain threshold of the currently estimated travel time, then the central database may not need to be updated, and no call will be made or data transferred. If the cellular telephone is otherwise in use, or the central database is busy, the data collector will refrain from sending a message at that time interval.

The central database 2 includes travel time data 20, a database update procedure 21 and a database retrieval procedure 22. The travel time data is illustrated more fully in FIG. 2. Since the map information is included in the on-board navigation system 10 of each automobile, it does not need to be included in the central database 2. The central database merely includes street or transition segment identifiers, and travel times. Alternatively, different map databases from different companies may be used in each automobile. In such a situation, the central database may need a map database which will permit conversion to each of the different databases in automobiles. Each street segment has a unique identifier, which corresponds to the identifier in the map database of the on-board navigation system 10. Associated with each street segment identifier is a determined travel time. Since travel times may be different in each direction, each direction of the street is considered a separate identifier. Transition segments, such as a left turn from one segment to another, is also provided with a travel time. The database update procedure 21 determines the travel times based upon travel data received from automobiles. Preferably, the travel times in the central database 2 would be moving averages, covering a predefined time period or number of data points. Upon receiving information from a data collector 12, the database update procedure 21 would eliminate the oldest data point for the identified route segment, add the new data point, and redetermine the moving average. Default data may be used when data received from the automobiles for a given segment is insufficient, which could occur on less travelled segments.

Other formulas can be used for combining data instead of a moving average. For example, more recent data could be more heavily weighted using a formula such as:

$$M' = t \cdot \alpha + M \cdot (1-\alpha)$$

where $\alpha$ is a coefficient between 0 and 1, and M is the mean travel time.

Additionally, standard deviations for each route segment can also be determined. Standard deviations can be used for eliminating spurious data. Such data may be caused by a person stopping for a short period of time on a street segment or a brief blockage of the street segment. Individual data which is significantly different from the stored travel times may be discarded as being erroneous. If standard deviations are being determined by the central database, then each data point becomes relevant, and the data collector in the automobiles should not filter the data.

FIG. 2 illustrates a potential format for the travel time data 20 in the central database 2. Each street segment 100 would include a unique street segment identifier 110 as discussed above. The travel time 115 corresponding to the street segment would be the mean or moving average of the received data. The standard deviation 120 may also be calculated and stored. Since different processed could be used to maintain data and determine the average travel time, the type of collection 125 (whether by time or number of data points), and the amount or value of the data collection 130 (minutes of duration or number or data points) would be stored for each street segment. In order to determine a moving average, a buffer with a set of data points 135 is maintained. In order to simplify the calculation of the average and standard deviation, the number of data points 140, sum of the data points 145, and sum of the squares of the data points 150 can also be determined and stored.

The database retrieval procedure 22 communicates with the route advisor 13 in each of the automobiles to provide updated travel time information for each route segment. Various alternatives can be used for updating travel times. When planning a route, the route advisor 13 can contact the central database 2 to obtain updated information for the locations of interest. Alternatively, the central database 2 may periodically dial up the automobile navigation system 1 to transfer travel time information. The travel time database may also be continuously broadcast through some type of radio network to all the vehicles on the system. Additionally, the route advisor 13 can provide a proposed route to the central database, which will then update the route advisor if significant changes occur in travel times for street segments in the planned route. If significant changes occur in travel times, the route advisor may choose to replan a new route from the current location to the destination in order to avoid any traffic tie-ups. A threshold for improvement in estimated times should be used in determining when to make changes in a route. Otherwise, changes in routes could become confusing to the operator.

Alternatively, the route advisor 13 can be located in conjunction with this central database 2. Each of the routes for the automobiles would be centrally determined. The route advisor 13 would then communicate with the cellular telephone 14 in the automobile to provide the route to the on-board navigation system 10. For route planning, the central database 2 would require a map database, as well as the time information. Route planning at the central database could result in improved coordination, especially for alternate routing. If traffic on one road becomes congested, various route advisors 13 could provide the same alternate routes which would result in additional congestion. The central database could be used to provide a variety of acceptable alternative routes to different navigational systems. This could reduce the congestion on the alternative routes.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A navigational system comprising:
   a central database including:
      a central memory storing a plurality of current travel times corresponding to actual travel times for vehicles traversing particular street segments which are received at the central database from vehicle transmitters;
      a route planner having an input for receiving starting and ending locations and having access to the central memory and an output indicating a travel route from the starting and ending locations having a minimum travel time based upon the current travel times; and
      a central database transmitter for transmitting a individual travel route to each of a plurality of vehicle navigation systems; and
   wherein each vehicle navigation system is associated with a respective one of a plurality of vehicles and comprises:
      a map database having data representing locations of street segments;
      a positioning device for receiving GPS satellite signals and determining a location of the vehicle in relation to street segments and determining when the vehicle has traversed street segments;
      a timer for determining a vehicle travel time for traversal of street segments;
      a storage device for storing traversed street segments and corresponding vehicle travel times;
      a vehicle transmitter for communicating the stored traversed street segments and corresponding vehicle travel times to the central database;
      a receiver for receiving the travel route transmitted by the central database;
      a vehicle memory storing the travel route.

2. The navigational system of claim 1, wherein the central database includes:
   a central database receiver for receiving traversed street segments and corresponding vehicle travel times from at least one of the vehicle navigation systems; and
   update means for updating at least one of the plurality of current travel times based upon a received corresponding vehicle travel time.

3. The navigational system of claim 2, wherein the update means includes means for determining a moving average of vehicle travel times from a plurality of the vehicle navigation systems corresponding to a single street segment.

4. The navigational system of claim 1, wherein the vehicle transmitter includes a cellular telephone.

5. The navigational system of claim 1, wherein the street segments include transition segments between two street segments.

6. The navigational system of claim 1, wherein the street segments are defined between midpoints of blocks.

7. The navigational system of claim 1, wherein the receiver includes a cellular telephone.

8. The navigational system of claim 1, wherein the vehicle navigation system further includes:
   direction means for providing directions to an operator regarding the travel route based upon the determined location of the vehicle.

9. The navigational system of claim 1, wherein the central database includes travel times for street segments and travel times for transitions between segments, wherein the travel times of transitions include times for proceeding through an intersection from one street segment to a following street segment and for turning onto adjoining street segments.

10. The navigational system of claim 6, wherein the street segments include intersections defining the blocks.

11. The navigational system of claim 1, further comprising means for computing a moving average of a number of vehicle travel times to define an average travel time for a street segment.

12. The navigational system of claim 11, wherein the means for computing the moving average uses the formula:

$$M' = t \cdot \alpha + M \cdot (1-\alpha)$$

wherein M' is the moving average, t is a most recent vehicle travel time, $\alpha$ is a coefficient between 0 and 1, and M is a mean travel time.

13. The navigational system of claim 1, wherein the central database includes means for determining a standard deviation in the vehicle travel times for each route segment.

14. The navigational system of claim 13, wherein the central database includes means for discarding a vehicle travel time which is significantly different from stored vehicle travel times.

15. The navigational system of claim 1, wherein the vehicle navigation systems include means for saving collected traffic data and for transferring periodically the collected traffic data to the central database.

16. The navigational system of claim 1, wherein the vehicle transmitter includes means for suppressing transfer of a vehicle travel time if the vehicle travel time is not significantly different from the current travel time.

17. A navigational system comprising:
   a central database including:
      a central memory storing a plurality of current travel times corresponding to actual travel times for vehicles traversing particular street segments which are received at the central database from vehicle transmitters; and
      a central database transmitter for transmitting the plurality current travel times to a plurality of vehicle navigation systems; and
   wherein each vehicle navigation system is associated with a respective one of a plurality of vehicles and comprises:
      a map database having data representing locations of street segments;
      a positioning device for receiving GPS satellite signals and determining a location of the vehicle in relation to street segments and determining when the vehicle has traversed street segments;
      a timer for determining a vehicle travel time for traversal of street segments;
      a storage device for storing traversed street segments and corresponding vehicle travel times;
      a vehicle transmitter for communicating the stored traversed street segments and corresponding vehicle travel times to the central database;
      a receiver for receiving the current travel times transmitted by the central database;
      a vehicle memory storing the travel route; and
      a route planner having an input for receiving starting and ending locations and having access to the vehicle memory and an output indicating a travel route from the starting and ending locations having a minimum travel time based upon the current travel times stored in the vehicle memory.

18. The navigational system of claim 19, wherein the central database includes:

a central database receiver for receiving traversed street segments and corresponding vehicle travel times from at least one of the vehicle navigation systems; and update means for updating at least one of the plurality of current travel times based upon a received corresponding vehicle travel time.

19. The navigational system of claim 18, wherein the update means includes means for determining a moving average of vehicle travel times from a plurality of the vehicle navigation systems corresponding to a single street segment.

20. The navigational system of claim 17, wherein the vehicle transmitter includes a cellular telephone.

21. The navigational system of claim 17, wherein the street segments include transition segments between two street segments.

22. The navigational system of claim 17, wherein the street segments are defined between midpoints of blocks.

23. The navigational system of claim 17, wherein the receiver includes a cellular telephone.

24. The navigational system of claim 17, wherein the vehicle navigation system further includes:

direction means for providing directions to an operator regarding the travel route based upon the determined location of the vehicle.

25. The navigational system of claim 17, wherein the central database includes travel times for street segments and travel times for transitions between segments, wherein the travel times of transitions include times for proceeding through an intersection from one street segment to a following street segment and for turning onto adjoining street segments.

26. The navigational system of claim 22, wherein the street segments include intersections defining the blocks.

27. The navigational system of claim 17, further comprising means for computing a moving average of a number of vehicle travel times to define an average travel time for a street segment.

28. The navigational system of claim 27, wherein the means for computing the moving average uses the formula:

$$M'=t\cdot\alpha+M\cdot(1-\alpha)$$

wherein M' is the moving average, t is a most recent vehicle travel time, $\alpha$ is a coefficient between 0 and 1, an M is a mean travel time.

29. The navigational system of claim 17, wherein the central database includes means for determining a standard deviation in the vehicle travel times for each route segment.

30. The navigational system of claim 29, wherein the central database includes means for discarding a vehicle travel time which is significantly different from stored vehicle travel times.

31. The navigational system of claim 17, wherein the vehicle navigation systems include means for saving collected traffic data and for transferring periodically the collected traffic data to the central database.

32. The navigational system of claim 17, wherein the communication means includes means for suppressing transfer of a vehicle travel time if the vehicle travel time is not significantly different from the current travel time.

* * * * *